(12) United States Patent
Sawada

(10) Patent No.: US 10,548,102 B2
(45) Date of Patent: Jan. 28, 2020

(54) COMMUNICATION APPARATUS, CONTROL METHOD THEREFOR, AND NON-TRANSITORY COMPUTER-READABLE STORAGE MEDIUM FOR A NEIGHBOR AWARENESS NETWORK

(71) Applicant: CANON KABUSHIKI KAISHA, Tokyo (JP)

(72) Inventor: Tetsuya Sawada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 15/265,266

(22) Filed: Sep. 14, 2016

(65) Prior Publication Data

US 2017/0086154 A1 Mar. 23, 2017

(30) Foreign Application Priority Data

Sep. 18, 2015 (JP) ................................ 2015-185514

(51) Int. Cl.
*H04W 4/00* (2018.01)
*H04W 56/00* (2009.01)
*H04W 48/16* (2009.01)
*H04W 84/12* (2009.01)

(52) U.S. Cl.
CPC ......... *H04W 56/001* (2013.01); *H04W 48/16* (2013.01); *H04W 84/12* (2013.01)

(58) Field of Classification Search
CPC .... H04W 56/001; H04W 48/15; H04W 84/12
See application file for complete search history.

(56) References Cited

U.S. PATENT DOCUMENTS

| 7,197,569 | B2 * | 3/2007 | Dowling | G06Q 20/04 370/401 |
| 2004/0192375 | A1 * | 9/2004 | Cho | H04W 60/005 455/550.1 |
| 2005/0048972 | A1 * | 3/2005 | Dorenbosch | H04W 36/32 455/436 |
| 2014/0328190 | A1 * | 11/2014 | Lord | H04W 24/08 370/252 |
| 2015/0036540 | A1 | 2/2015 | Kasslin et al. | |
| 2015/0351114 | A1 * | 12/2015 | Wolf | H04L 67/1085 370/330 |

FOREIGN PATENT DOCUMENTS

| WO | 2014186261 A1 | 11/2014 |
| WO | 2015021780 A1 | 2/2015 |
| WO | 2015080079 A1 | 6/2015 |

OTHER PUBLICATIONS

Notice of Reasons for Refusal issued by the Japanese Patent Office dated May 27, 2019 in corresponding Japanese Patent Application No. 2015-185514 with English translation.

\* cited by examiner

*Primary Examiner* — Stephen M D Agosta
(74) *Attorney, Agent, or Firm* — Carter, DeLuca & Farrell LLP

(57) ABSTRACT

A communication apparatus performs control to recognize another communication apparatus joining a cluster based on neighbor awareness networking, determines a wireless communication state about a wireless network different from the neighbor awareness networking in the communication apparatus, and switches, based on a determination result, whether to perform the control.

7 Claims, 10 Drawing Sheets

COMMUNICATION APPARATUS, CONTROL METHOD THEREFOR, AND NON-TRANSITORY COMPUTER-READABLE STORAGE MEDIUM FOR A NEIGHBOR AWARENESS NETWORK

BACKGROUND OF THE INVENTION

Field of the Invention

The present invention relates to a communication apparatus, a control method therefor, and a non-transitory computer-readable storage medium.

Description of the Related Art

In recent years, there have been proposed a technique in which a wireless LAN compatible device (to be referred to as a wireless LAN device hereinafter) recognizes an adjacent wireless LAN device and a technique of recognizing a network formed by an adjacent wireless LAN device or a service provided in the network.

U.S. Patent Application Publication No. 2015/0036540 proposes neighbor awareness networking (to be referred to as NAN hereinafter) technology. In NAN, a plurality of wireless LAN devices transmit beacons to be synchronized with each other, and set a search period called a discovery window, thereby recognizing each other during the period. U.S. Patent Application Publication No. 2015/0036540 describes a method in which a neighbor awareness network called a cluster where time synchronization is established is formed between wireless LAN devices and the devices recognize each other during only the search period. According to the method described in U.S. Patent Application Publication No. 2015/0036540, it is possible to suppress the power consumption.

Even if, however, the method described in U.S. Patent Application Publication No. 2015/0036540 is used, it is impossible to avoid an increase in power consumption and an increase in calculation processing for performing a neighbor awareness operation in a wireless LAN device. At this time, if the number of clusters to which a wireless LAN device belongs increases due to an increase in the number of wireless LAN devices existing around the wireless LAN device, the power consumption and calculation processing may further increase. Therefore, it is necessary to efficiently use a neighbor awareness network in accordance with the wireless communication state of the wireless LAN device.

SUMMARY OF THE INVENTION

The present invention has been made in consideration of the above problem, and provides a technique for efficiently using a neighbor awareness network.

According to one aspect of the present invention there is provided a communication apparatus which comprises: a control unit configured to perform control to recognize another communication apparatus joining a cluster based on neighbor awareness networking; a determination unit configured to determine a wireless communication state about a wireless network different from the neighbor awareness networking in the communication apparatus; and a switching unit configured to switch, based on a determination result of the determination unit, whether to cause the control unit to perform the control.

Further features of the present invention will become apparent from the following description of exemplary embodiments (with reference to the attached drawings).

DESCRIPTION OF THE EMBODIMENTS

[First Embodiment]

Figure 1:
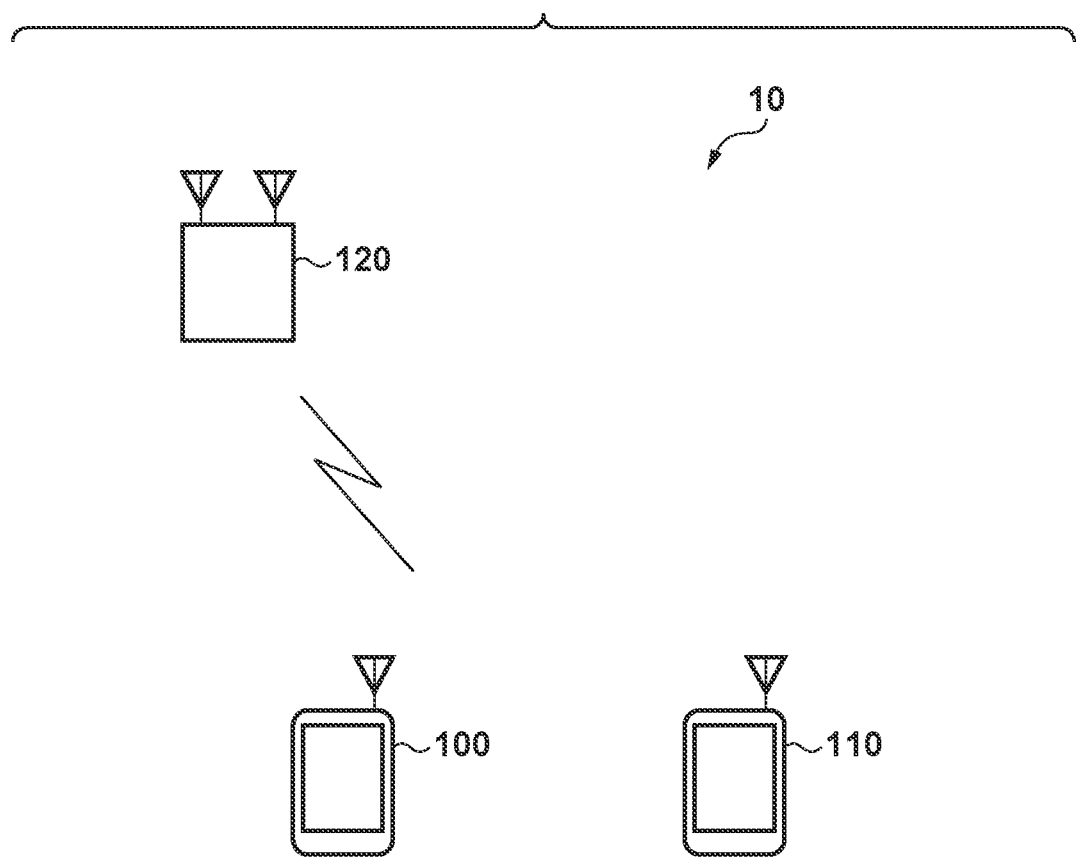
FIG. 1 is a view showing an example of the configuration of a communication system according to the first embodiment.

The first embodiment of the present invention will be described below with reference to FIGS. 1 to 4. FIG. 1 shows an example of the configuration of a communication system 10 according to this embodiment. The communication system 10 includes stations (to be referred to as STAs hereinafter) 100 and 110, and an access point 120 (to be referred to as an AP hereinafter). The STAs 100 and 110 are communication apparatuses complying with the IEEE802.11 series, and have a function of performing wireless LAN connection to the AP 120 or another STA to make communication. Note that FIG. 1 shows the two STAs but three or more STAs may exist. The AP 120 is a communication apparatus complying with the IEEE802.11 series, and has a function of forming a wireless LAN infrastructure network by accommodating STAs including the STAs 100 and 110.

Figure 2:
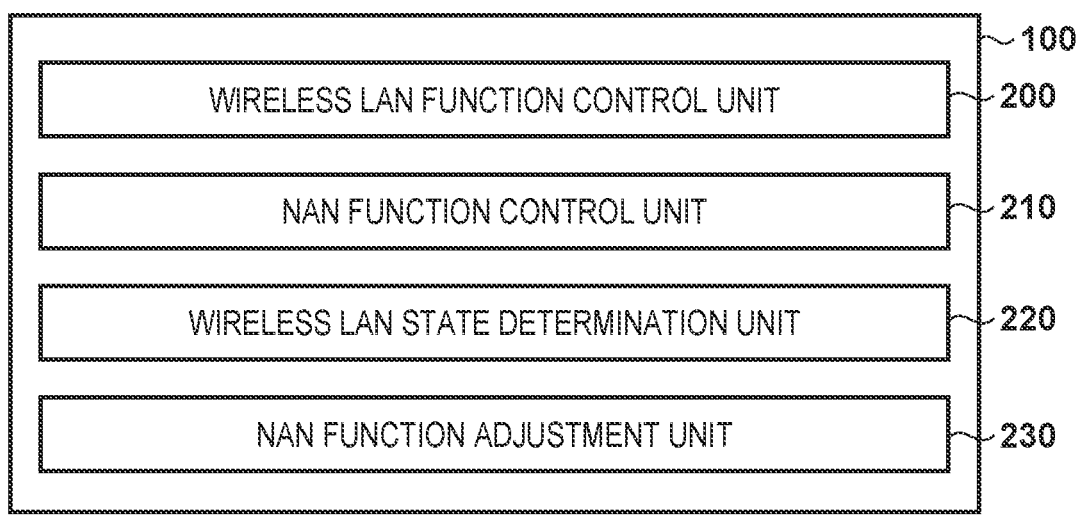
FIG. 2 is a block diagram showing the functional block arrangement of an STA 100 according to the first embodiment.

FIG. 2 shows the functional block arrangement of the STA 100 according to this embodiment. The STA 110 has the same functional block arrangement as that of the STA 100.

A wireless LAN function control unit 200 performs control to operate as a wireless LAN STA. For example, the wireless LAN function control unit 200 performs control to join a wireless LAN infrastructure network formed by the AP 120. Furthermore, for example, the wireless LAN function control unit 200 performs control to join a wireless LAN direct network complying with the Wi-Fi Direct standard.

A NAN function control unit 210 performs control to establish time synchronization with another wireless LAN device, form a neighbor awareness network called a NAN cluster (to be referred to as a cluster hereinafter), and recognize each other during a search period. More specifically, as control to recognize a neighboring wireless LAN device, the NAN function control unit 210 performs processing of detecting a discovery beacon. The discovery beacon is a signal periodically (for example, every 100 ms) transmitted by a NAN device operating to play a master role in an existing cluster. The discovery beacon contains information indicating the timing of a discovery window (to be referred to as a DW hereinafter) as a search period in the cluster to which the master as a transmission source belongs. Thus, the STA 100 can know the DW in the existing cluster by receiving the discovery beacon. When the STA 100 detects the discovery beacon and discovers the existing cluster, it performs processing of detecting a sync beacon during the period of the DW in the cluster. The sync beacon is a signal which has been determined to be transmitted during the period of the DW by a NAN device operating to play a master or non-master sync role in the existing cluster. The STA 100 can recognize a wireless LAN device joining the cluster, that is, a neighboring wireless LAN device by detecting the sync beacon transmitted during the period of the DW.

Note that each communication apparatus joining the cluster transmits/receives the discovery beacon and sync beacon using channel 6 (2.437 GHz) in a frequency band of 2.4 GHz. If there is no existing cluster, the STA 100 forms a new cluster, and operates as a master in the cluster to transmit a discovery beacon. If the STA 100 and another wireless LAN device can recognize each other using the NAN function control unit 210, the STA 100 communicates with the other wireless LAN device under the control of the wireless LAN function control unit 200. More specifically, the STA 100 performs wireless LAN connection to another wireless LAN device in a wireless LAN infrastructure network or a wireless LAN direct network complying with the Wi-Fi Direct standard. This allows the STA 100 to perform desired communication with the other wireless LAN device such as the STA 110.

A wireless LAN state determination unit 220 performs control to determine the wireless communication state of the STA 100. The wireless communication state to be determined is a wireless communication state about a wireless network different from the neighbor awareness network. For example, the wireless LAN state determination unit 220 determines whether the STA 100 is currently connected to a registered wireless LAN device.

A NAN function adjustment unit 230 detects the start of control by the NAN function control unit 210 via a user operation, an instruction from an application, or the like. Furthermore, if the wireless LAN state determination unit 220 determines the wireless communication state of the STA 100, the NAN function adjustment unit 230 switches the control by the NAN function control unit 210 to an enable or disable state based on the determination result. In this way, the NAN function adjustment unit 230 adjusts the execution status of the control by the NAN function control unit 210.

Figure 3:
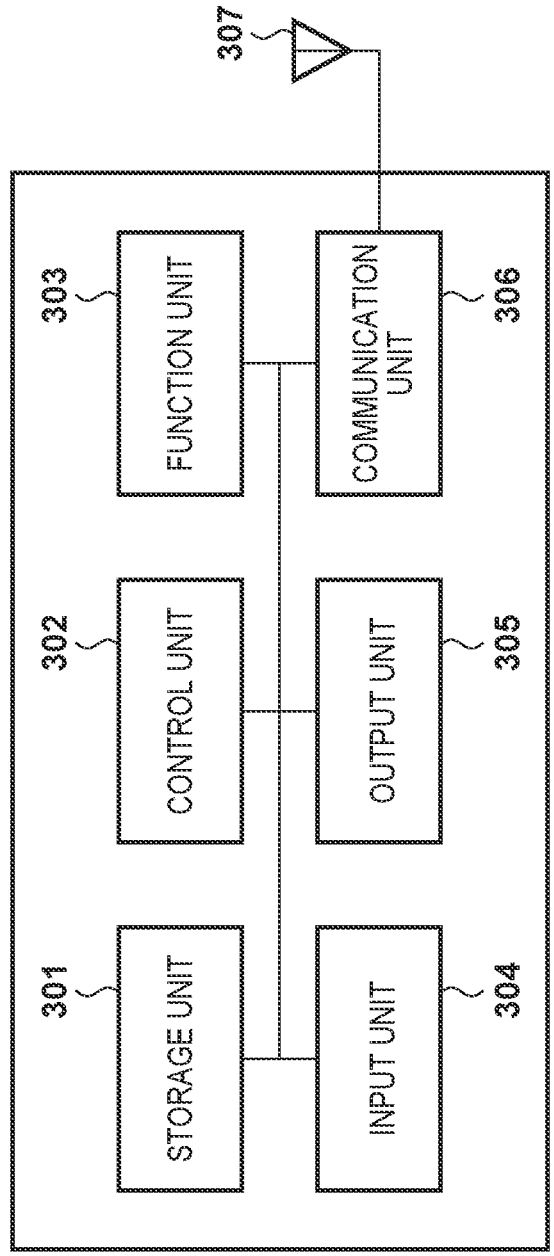
FIG. 3 is a block diagram showing the hardware arrangement of the STA 100 according to the first embodiment.

FIG. 3 shows the hardware arrangement of the STA 100. The STA 110 has the same hardware arrangement as that of the STA 100.

A storage unit 301 is formed by one or both of a ROM and a RAM, and stores programs for executing respective functional units shown in FIG. 2, programs for performing various operations (to be described later), and various kinds of information such as communication parameters for wireless communication. The ROM is an abbreviation for Read Only Memory, and the RAM is an abbreviation for Random Access Memory. Instead of the memory such as the ROM or RAM, a storage medium such as a flexible disk, hard disk, optical disk, magnetooptical disk, CD-ROM, CD-R, magnetic tape, nonvolatile memory card, or DVD may be used as the storage unit 301.

A control unit 302 is formed by a CPU or MPU, and controls the overall STA 100 by executing the programs stored in the storage unit 301. The CPU is an abbreviation for Central Processing Unit, and the MPU is an abbreviation for Microprocessor Unit. Note that the control unit 302 may control the overall STA 100 in cooperation with an OS (Operating System) and the programs stored in the storage unit 301.

The control unit 302 controls a function unit 303 to execute predetermined processing such as imaging, printing, and projection. The function unit 303 is hardware used by the STA 100 to execute predetermined processing. If, for example, the STA 100 is a camera, the function unit 303 serves as an imaging unit and performs imaging processing. If, for example, the STA 100 is a printer, the function unit 303 serves as a printing unit, and performs print processing. If, for example, the STA 100 is a projector, the function unit 303 serves as a projection unit, and performs projection processing. Data processed by the function unit 303 may be data stored in the storage unit 301 or data communicated with another apparatus via a communication unit 306 (to be described later).

An input unit 304 accepts various operations from the user. An output unit 305 outputs various kinds of information to the user. The output from the output unit 305 includes at least one of display on a screen, a voice output from a loudspeaker, a vibration output, and the like. Note that both of the input unit 304 and the output unit 305 may be implemented by one module like a touch panel.

The communication unit 306 controls wireless communication complying with the IEEE802.11 series, and controls IP (Internet Protocol) communication. The communication unit 306 controls an antenna 307 to transmit/receive a wireless signal for wireless communication. The STA 100 communicates a content such as image data, document data, or video data with the other STA 110 via the communication unit 306.

Figure 4:
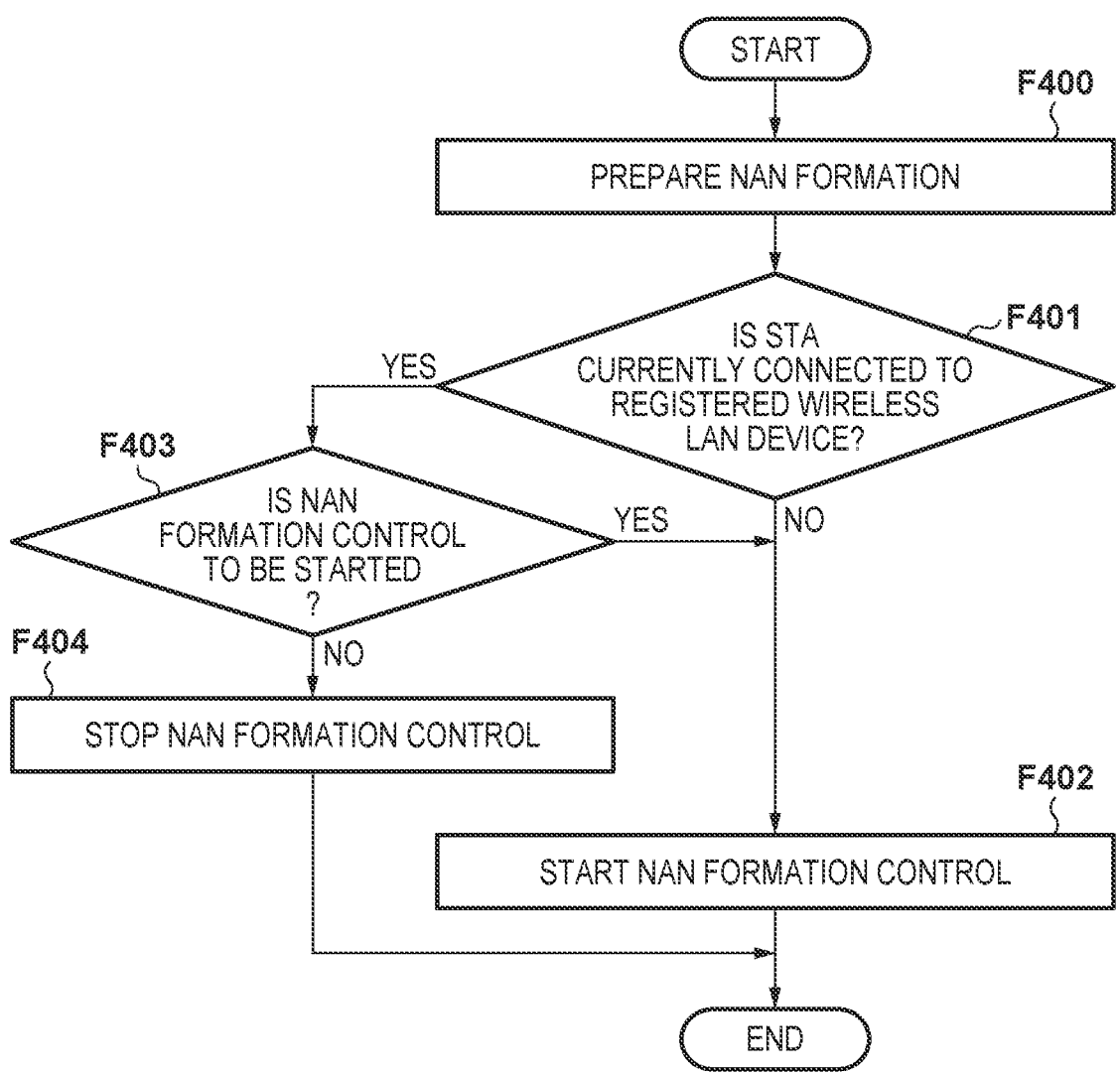
FIG. 4 is a flowchart illustrating the processing of the STA 100 according to the first embodiment.

FIG. 4 is a flowchart illustrating processing performed when the control unit of the STA 100 executes the program stored in the storage unit according to this embodiment. In this embodiment, the processing shown in FIG. 4 is executed when, for example, the STA 100 performs a neighbor awareness operation to make desired communication while power is supplied to the STA 100, the wireless LAN function control unit 200 is in the enable state, and the STA 100 can operate as an STA. The processing is started by a user operation on the input unit 304, an instruction of an application, or the like.

After the start of the processing, in step F400, the NAN function adjustment unit 230 detects the start of control by the NAN function control unit 210 via a user operation or an instruction of an application or the like. In step F400, the STA 100 is in a NAN formation preparation stage, and the control by the NAN function control unit 210 may not have been started yet or may have been partially started. In step F401, the wireless LAN state determination unit 220 determines the wireless communication state of the STA 100. In this embodiment, the wireless LAN state determination unit 220 determines whether the STA 100 is currently connected to a wireless LAN device such as an AP (for example, the AP 120) already registered in the STA 100. If the STA 100 is not currently connected to a wireless LAN device (NO in step F401), the process advances to step F402; otherwise (YES in step F401), the process advances to step F403.

In step F402, the NAN function adjustment unit 230 switches the control by the NAN function control unit 210 to the enable state. In response to this, the NAN function control unit 210 forms a neighbor awareness network, performs control to recognize a neighboring wireless LAN device, and terminates this processing. On the other hand, in step F403, the STA 100 determines, with the user via the output unit 305 or the like, whether to start control to form a neighbor awareness network. If it is determined via a user operation on the input unit 304 or the like that the STA 100 starts control to form a neighbor awareness network (YES in step F403), the process advances to step F402; otherwise (NO in step F403), the process advances to step F404. In step F404, the NAN function adjustment unit 230 switches the control by the NAN function control unit 210 to the disable state. In response to this, the NAN function control unit 210 terminates this processing without performing control to recognize a neighboring wireless LAN device.

[Second Embodiment]

The second embodiment of the present invention will be described below with reference to FIG. 5. Note that the arrangement of a communication system 10 and that of an STA 100 according to this embodiment are the same as in the first embodiment.

Figure 5:
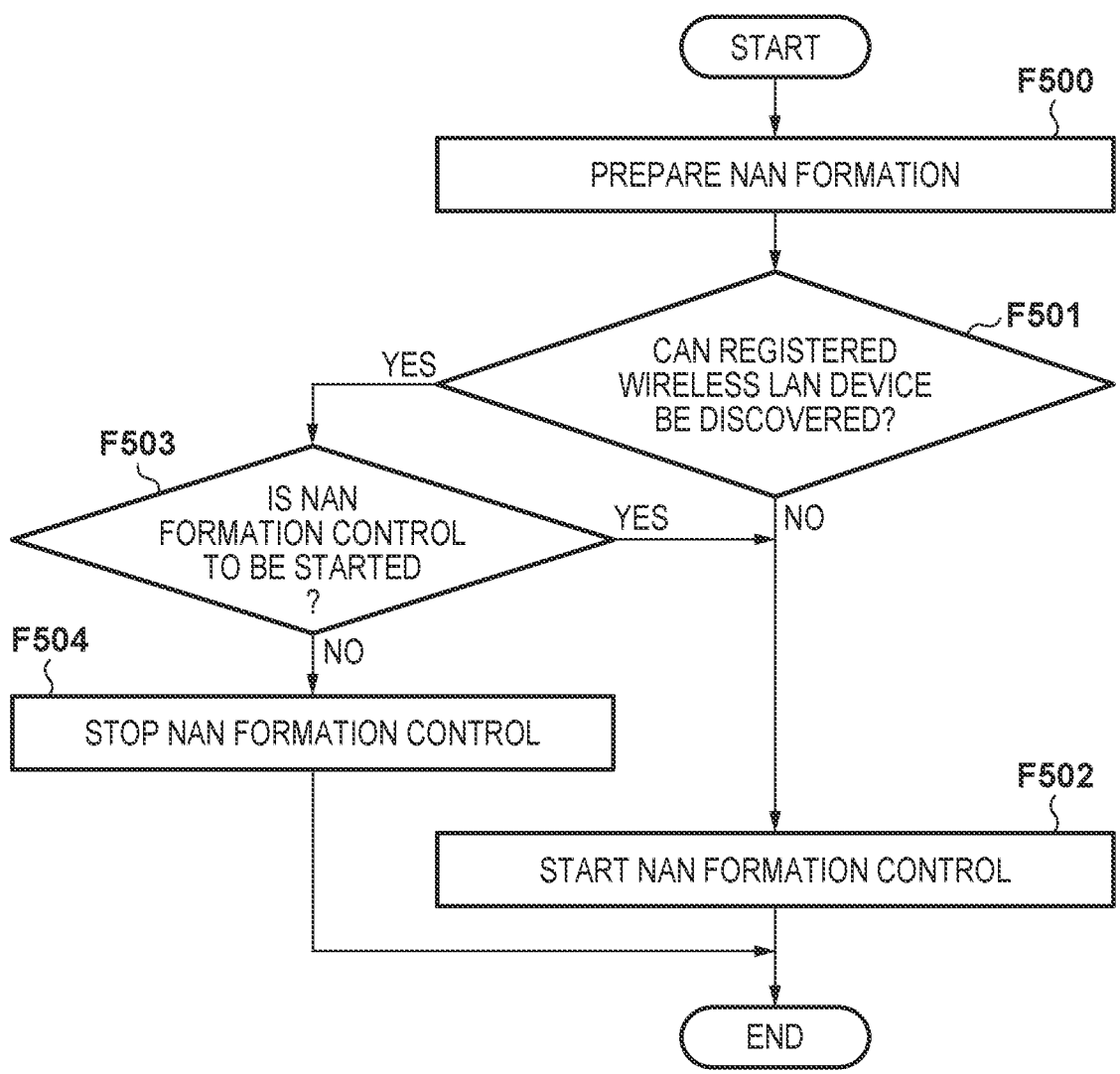
FIG. 5 is a flowchart illustrating the processing of an STA 100 according to the second embodiment.

FIG. 5 is a flowchart illustrating processing performed when the control unit of the STA 100 executes a program stored in a storage unit according to this embodiment. In this embodiment, the processing shown in FIG. 5 is executed when, for example, the STA 100 performs a neighbor awareness operation to make desired communication while power is supplied to the STA 100, a wireless LAN function control unit 200 is in the enable state, and the STA 100 can operate as an STA. The processing is started by a user operation on an input unit 304, an instruction of an application, or the like.

After the start of the processing, in step F500, a NAN function adjustment unit 230 detects the start of control by a NAN function control unit 210 via a user operation or an instruction of an application or the like. In step F500, the STA 100 is in a NAN formation preparation stage, and the control by the NAN function control unit 210 may not have been started yet or may have been partially started. In step F501, a wireless LAN state determination unit 220 determines the wireless communication state of the STA 100. In this embodiment, the wireless LAN state determination unit 220 determines whether it is possible to discover a wireless LAN device (registered wireless LAN device) such as an STA which has already been registered in the STA 100 and has been connected in the past. For example, the wireless LAN state determination unit 220 causes the wireless LAN function control unit 200 to performs a scan operation of discovering a wireless LAN infrastructure network or an operation of discovering a device in a wireless LAN direct network. If no registered wireless LAN device is discovered (NO in step F501), the process advances to step F502; otherwise (YES in step F501), the process advances to step F503.

In step F502, the NAN function adjustment unit 230 switches the control by the NAN function control unit 210 to the enable state. In response to this, the NAN function control unit 210 forms a neighbor awareness network, performs control to recognize a neighboring wireless LAN device, and terminates this processing. On the other hand, in step F503, the STA 100 determines, with the user via an output unit 305 or the like, whether to start control to form a neighbor awareness network. If it is determined via a user operation on the input unit 304 or the like that the STA 100 starts control to form a neighbor awareness network (YES in step F503), the process advances to step F502; otherwise (NO in step F503), the process advances to step F504. In step F504, the NAN function adjustment unit 230 switches the control by the NAN function control unit 210 to the disable state. In response to this, the NAN function control unit 210 terminates this processing without performing control to recognize a neighboring wireless LAN device.

[Third Embodiment]

The third embodiment of the present invention will be described below with reference to FIG. 6. Note that the arrangement of a communication system 10 and that of an STA 100 according to this embodiment are the same as in the first embodiment.

Figure 6:
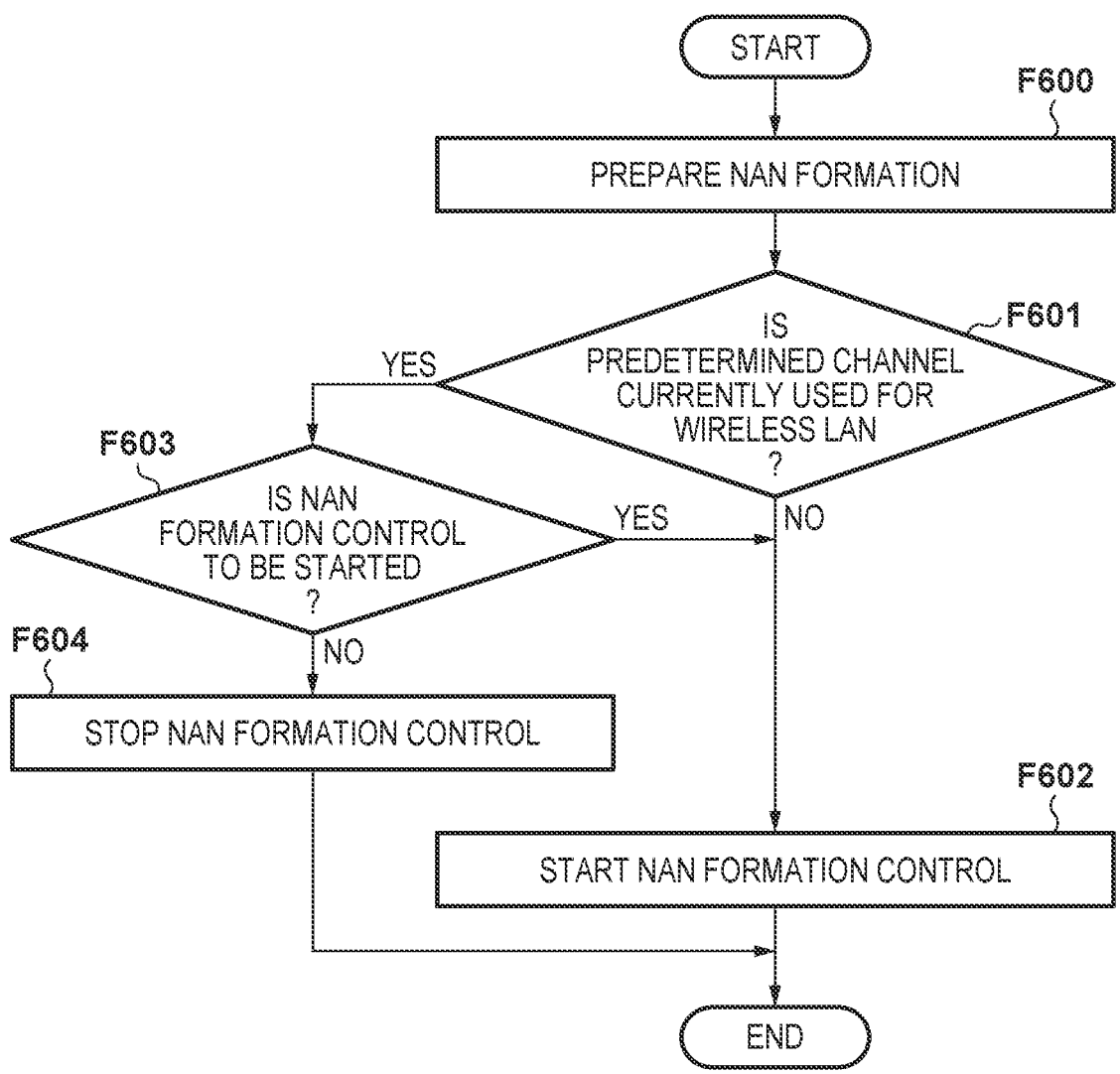
FIG. 6 is a flowchart illustrating the processing of an STA 100 according to the third embodiment.

FIG. 6 is a flowchart illustrating processing performed when the control unit of the STA 100 executes a program stored in a storage unit according to this embodiment. In this embodiment, the processing shown in FIG. 6 is executed when, for example, the STA 100 performs a neighbor awareness operation to make desired communication while power is supplied to the STA 100, a wireless LAN function control unit 200 is in the enable state, and the STA 100 can operate as an STA. The processing is started by a user operation on an input unit 304, an instruction of an application, or the like.

After the start of the processing, in step F600, a NAN function adjustment unit 230 detects the start of control by a NAN function control unit 210 via a user operation or an instruction of an application or the like. In step F600, the STA 100 is in a NAN formation preparation stage, and the control by the NAN function control unit 210 may not have been started yet or may have been partially started. In step F601, a wireless LAN state determination unit 220 determines the wireless communication state of the STA 100. In this embodiment, the wireless LAN state determination unit 220 determines whether a frequency channel currently used by the wireless LAN function control unit 200 is a predetermined frequency channel. For example, the wireless LAN state determination unit 220 determines whether a frequency channel currently used by the wireless LAN function control unit 200 is a frequency channel usable to form a neighbor awareness network. More specifically, it is determined whether a frequency channel currently used by the wireless LAN function control unit 200 is channel 6 in a frequency band of 2.4 GHz. If the same frequency channel as that usable to form a neighbor awareness network is currently used (YES in step F601), the process advances to step F602; otherwise (NO in step F601), the process advances to step F603.

In step F602, the NAN function adjustment unit 230 switches the control by the NAN function control unit 210 to the enable state. In response to this, the NAN function control unit 210 forms a neighbor awareness network, performs control to recognize a neighboring wireless LAN device, and terminates this processing. On the other hand, in step F603, the STA 100 determines, with the user via an output unit 305 or the like, whether to start control to form a neighbor awareness network. If it is determined via a user operation on the input unit 304 or the like that the STA 100 starts control to form a neighbor awareness network (YES in step F603), the process advances to step F602; otherwise (NO in step F603), the process advances to step F604. In step F604, the NAN function adjustment unit 230 switches the control by the NAN function control unit 210 to the disable state. In response to this, the NAN function control unit 210 terminates this processing without performing control to recognize a neighboring wireless LAN device.

[Fourth Embodiment]

The fourth embodiment of the present invention will be described below with reference to FIG. 7. Note that the arrangement of a communication system 10 and that of an STA 100 according to this embodiment are the same as in the first embodiment.

Figure 7:
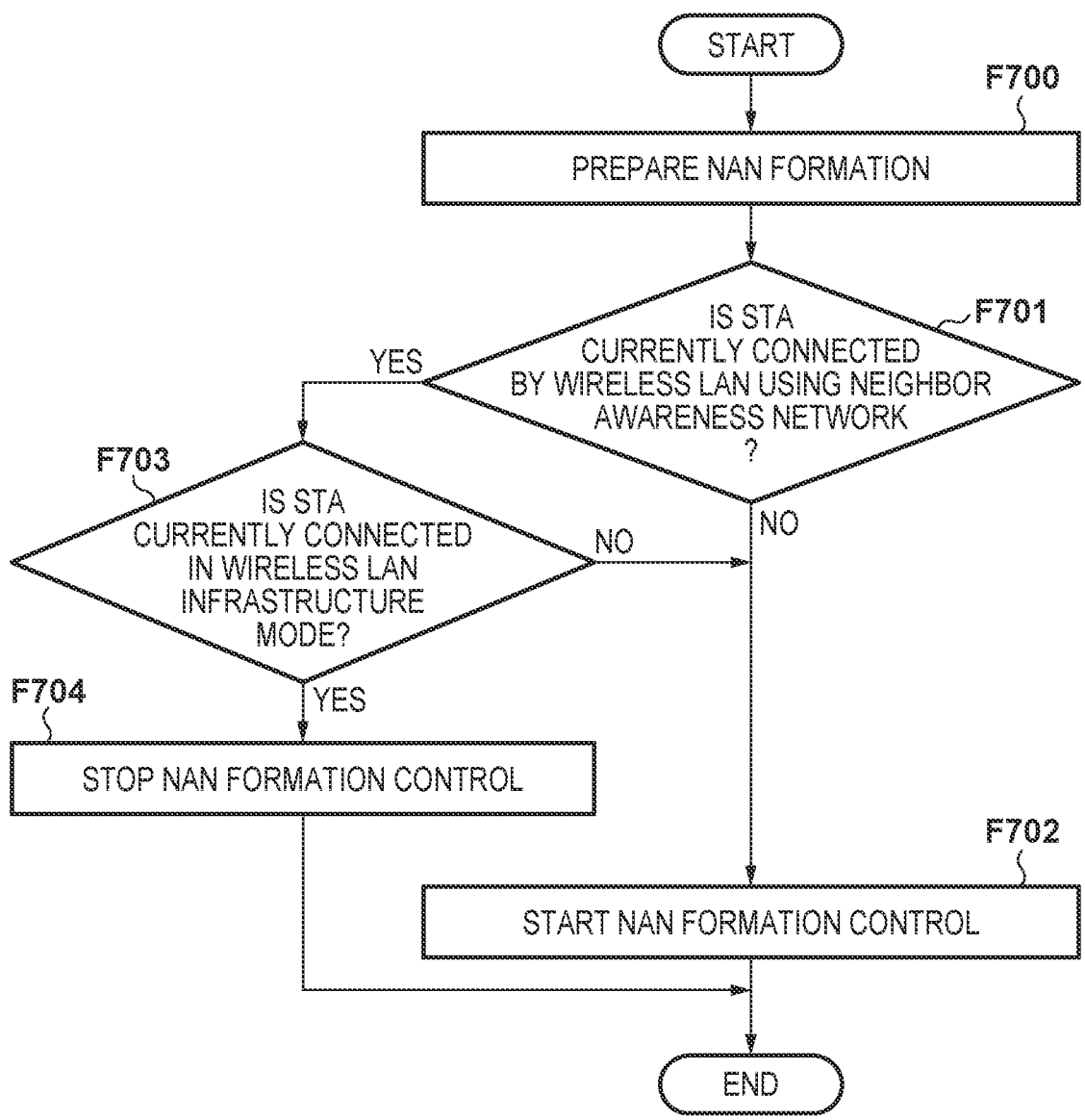
FIG. 7 is a flowchart illustrating the processing of an STA 100 according to the fourth embodiment.

FIG. 7 is a flowchart illustrating processing performed when the control unit of the STA 100 executes a program stored in a storage unit according to this embodiment. In this embodiment, the processing shown in FIG. 7 is executed when, for example, the STA 100 performs a neighbor awareness operation to make desired communication while power is supplied to the STA 100, a wireless LAN function control unit 200 is in the enable state, and the STA 100 can operate as an STA. The processing is started by a user operation on an input unit 304, an instruction of an application, or the like.

In step F700, a NAN function adjustment unit 230 detects the start of control by a NAN function control unit 210 via a user operation or an instruction of an application or the like. In step F700, the STA 100 is in a NAN formation preparation stage, and the control by the NAN function control unit 210 may not have been started yet or may have been partially started. In step F701, a wireless LAN state determination unit 220 determines the wireless communication state of the STA 100. In this embodiment, the wireless LAN state determination unit 220 determines whether there exists a wireless LAN infrastructure network or wireless LAN direct network to which the NAN function control unit 210 has recognized and connected a neighboring wireless LAN device. As a determination method, for example, the wireless LAN state determination unit 220 performs processing of recognizing a neighboring wireless LAN device, and determines whether the STA is currently connected to the recognized wireless LAN device by a wireless LAN. As another determination method, the STA 100 may store in advance information indicating whether another wireless LAN device is a wireless LAN device recognized by a neighbor awareness network, and determine the information when performing connection to the other wireless LAN device. If it is determined that the STA is not currently connected to the recognized wireless LAN device (NO in step F701), the process advances to step F702; otherwise (YES in step F701), the process advances to step F703.

In step F702, the NAN function adjustment unit 230 switches the control by the NAN function control unit 210 to the enable state. In response to this, the NAN function control unit 210 forms a neighbor awareness network, performs control to recognize a neighboring wireless LAN device, and terminates this processing. On the other hand, in step F703, the wireless LAN state determination unit 220 determines whether the STA 100 is currently connected in a wireless LAN infrastructure mode. If it is determined that the STA 100 is not currently connected in the wireless LAN infrastructure mode (NO in step F703), the process advances to step F702; otherwise (YES in step F703), the process advances to step F704. In step F704, the NAN function adjustment unit 230 switches the control by the NAN function control unit 210 to the disable state. In response to this, the NAN function control unit 210 terminates this processing without performing control to recognize a neighboring wireless LAN device.

[Fifth Embodiment]

The fifth embodiment of the present invention will be described below with reference to FIG. 8. Note that the arrangement of a communication system 10 and that of an STA 100 according to this embodiment are the same as in the first embodiment.

Figure 8:
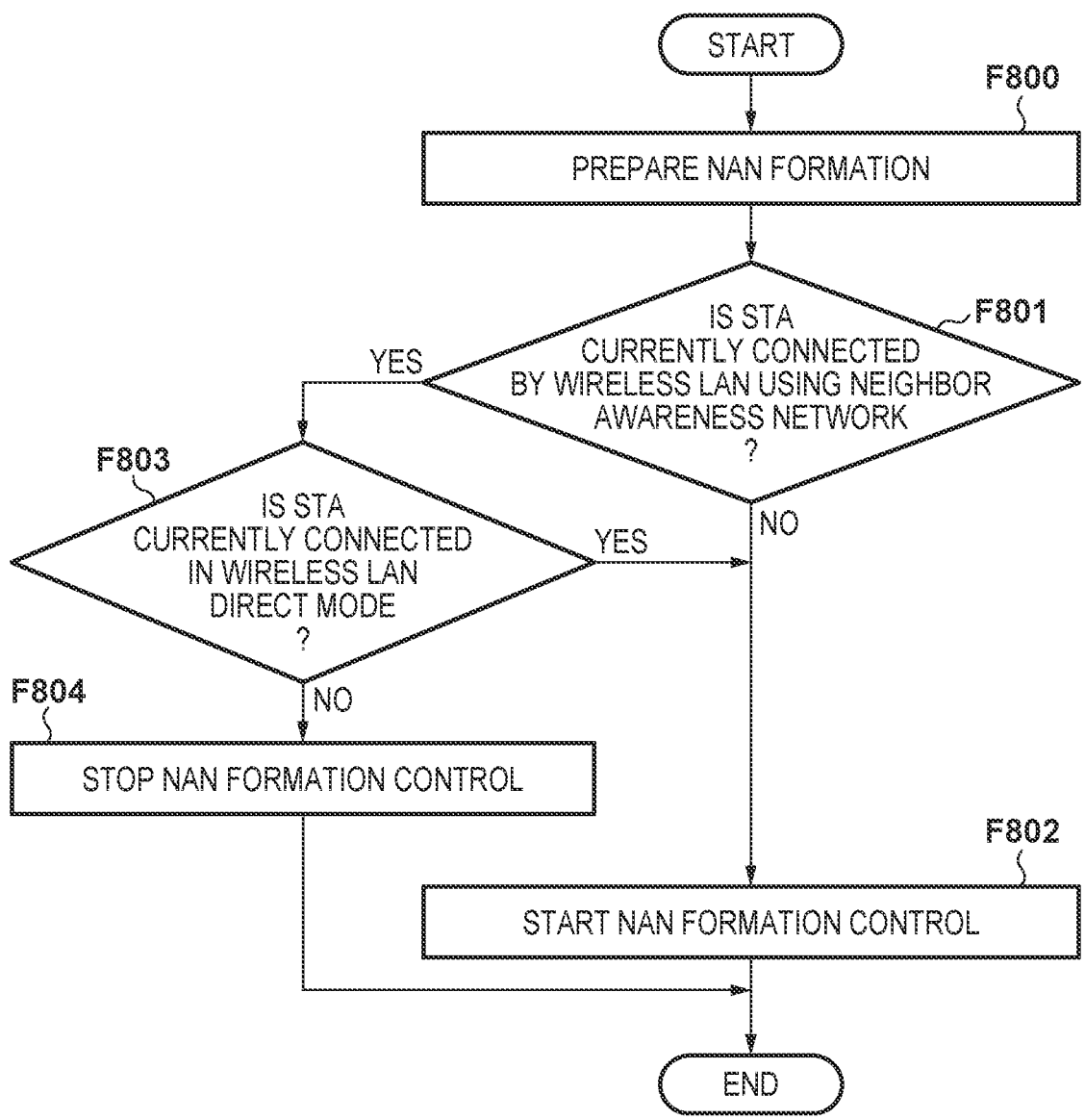
FIG. 8 is a flowchart illustrating the processing of an STA 100 according to the fifth embodiment.

FIG. 8 is a flowchart illustrating processing performed when the control unit of the STA 100 executes a program stored in a storage unit according to this embodiment. In this embodiment, the processing shown in FIG. 8 is executed when, for example, the STA 100 performs a neighbor awareness operation to make desired communication while power is supplied to the STA 100, a wireless LAN function control unit 200 is in the enable state, and the STA 100 can operate as an STA. The processing is started by a user operation on an input unit 304, an instruction of an application, or the like.

In step F800, a NAN function adjustment unit 230 detects the start of control by a NAN function control unit 210 via a user operation or an instruction of an application or the like. In step F800, the STA 100 is in a NAN formation preparation stage, and the control by the NAN function control unit 210 may not have been started yet or may have been partially started. In step F801, a wireless LAN state determination unit 220 determines the wireless communication state of the STA 100. In this embodiment, the wireless LAN state determination unit 220 determines whether there exists a wireless LAN infrastructure network or wireless LAN direct network to which the NAN function control unit 210 has recognized and connected a neighboring wireless LAN device. As a determination method, for example, the wireless LAN state determination unit 220 performs processing of recognizing a neighboring wireless LAN device, and determines whether the STA is currently connected to the recognized wireless LAN device by a wireless LAN. As another determination method, the STA 100 may store in advance information indicating whether another wireless LAN device is a wireless LAN device recognized by a neighbor awareness network, and determine the information when performing connection to the other wireless LAN device. If it is determined that the STA is not currently connected to the recognized wireless LAN device (NO in step F801), the process advances to step F802; otherwise (YES in step F801), the process advances to step F803.

In step F802, the NAN function adjustment unit 230 switches the control by the NAN function control unit 210 to the enable state. In response to this, the NAN function control unit 210 forms a neighbor awareness network, performs control to recognize a neighboring wireless LAN device, and terminates this processing. On the other hand, in step F803, the wireless LAN state determination unit 220 determines whether the STA 100 is currently connected in a wireless LAN direct mode. If it is determined that the STA 100 is currently connected in the wireless LAN direct mode (YES in step F803), the process advances to step F802; otherwise (NO in step F803), the process advances to step F804. In step F804, the NAN function adjustment unit 230 switches the control by the NAN function control unit 210 to the disable state. In response to this, the NAN function control unit 210 stops the control to recognize the neighboring wireless LAN device, and terminates this processing.

[Sixth Embodiment]

The sixth embodiment of the present invention will be described below with reference to FIG. 9. Note that the arrangement of a communication system 10 and that of an STA 100 according to this embodiment are the same as in the first embodiment.

Figure 9:
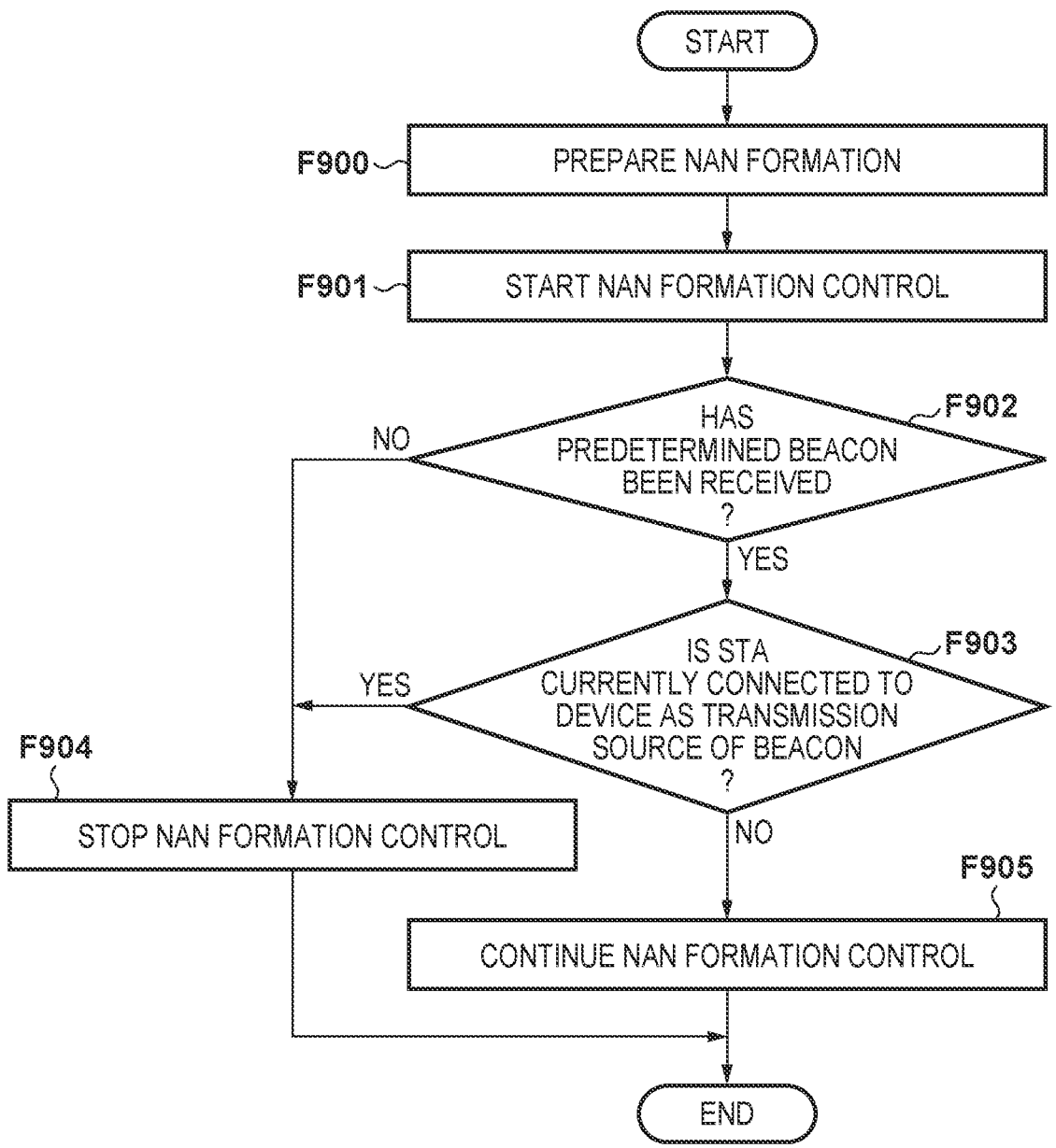
FIG. 9 is a flowchart illustrating the processing of an STA 100 according to the sixth embodiment.

FIG. 9 is a flowchart illustrating processing performed when the control unit of the STA 100 executes a program stored in a storage unit according to this embodiment. In this embodiment, the processing shown in FIG. 9 is executed when, for example, the STA 100 performs a neighbor awareness operation to make desired communication while power is supplied to the STA 100, a wireless LAN function control unit 200 is in the enable state, and the STA 100 can operate as an STA. The processing is started by a user operation on an input unit 304, an instruction of an application, or the like.

After the start of the processing, in step F900, a NAN function adjustment unit 230 detects the start of control by a NAN function control unit 210 via a user operation or an instruction of an application or the like. In step F900, the STA 100 is in a NAN formation preparation stage, and the control by the NAN function control unit 210 may not have been started yet or may have been partially started. In step F901, a NAN function adjustment unit 230 switches the control by the NAN function control unit 210 to the enable state, forms a neighbor awareness network, and starts control to recognize a neighboring wireless LAN device.

In step F902, the NAN function control unit 210 determines whether it is possible to recognize a neighboring wireless LAN device. For example, the NAN function control unit 210 determines whether the STA 100 has received a predetermined beacon (for example, a sync beacon) indicating that a neighboring wireless LAN device has formed a neighbor awareness network. If it is determined that the predetermined beacon has been received (YES in step F902), the process advances to step F903; otherwise, the process advances to step F904.

In step F903, a wireless LAN state determination unit 220 determines whether the STA 100 is currently connected to the wireless LAN device recognized in step F902. For example, the wireless LAN state determination unit 220 determines whether the STA 100 is currently connected to a wireless LAN device as the transmission source of the predetermined beacon indicating that the neighbor awareness network has been formed. To perform this determination processing, the wireless LAN state determination unit 220 may perform determination by test communication or by the MAC (Media Access Control) address of the wireless LAN device. If it is determined that the STA 100 is currently connected to the wireless LAN device (YES in step F903), the process advances to step F904; otherwise (NO in step F903), the process advances to step F905. In step F904, the NAN function adjustment unit 230 switches the control by the NAN function control unit 210 to the disable state. In response to this, the NAN function control unit 210 stops the control to recognize a neighboring wireless LAN device, and terminates this processing. In step F905, the NAN function adjustment unit 230 switches the control by the NAN function control unit 210 to the enable state. In response to this, the NAN function control unit 210 forms a neighbor awareness network, continues the control to recognize a neighboring wireless LAN device, and terminates this processing.

[Seventh Embodiment]

The seventh embodiment of the present invention will be described below with reference to FIGS. 10 and 11. Note that the arrangement of a communication system 10 according to this embodiment is the same as in the first embodiment.

Figure 10:
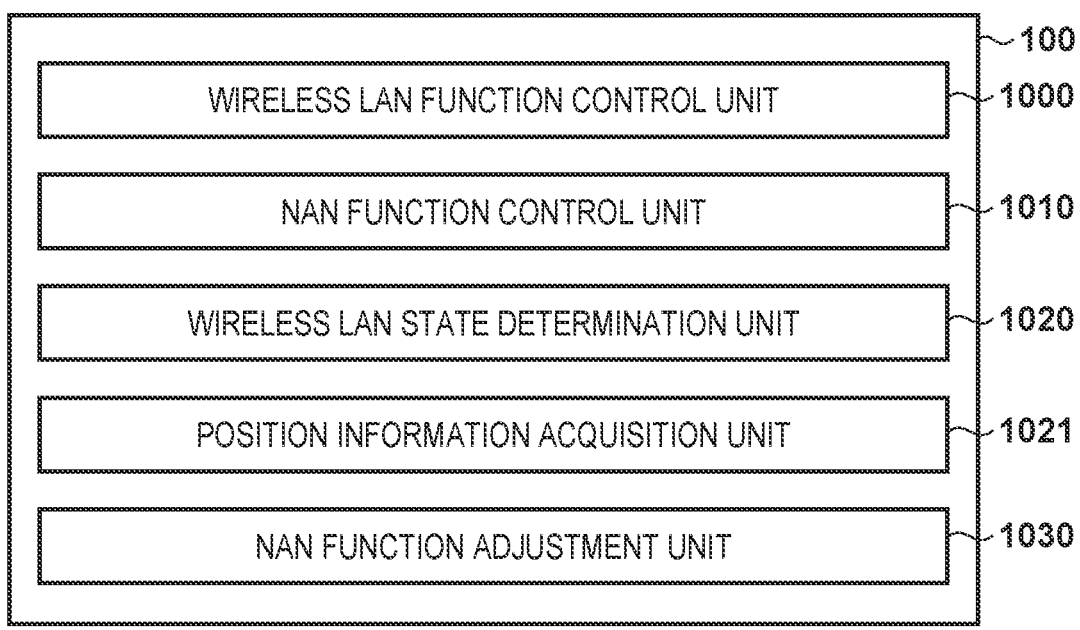
FIG. 10 is a block diagram showing the functional block arrangement of an STA 100 according to the seventh embodiment.

FIG. 10 shows the functional block arrangement of an STA 100 according to this embodiment. An STA 110 has the same functional block arrangement as that of the STA 100. A wireless LAN function control unit 1000, a NAN function control unit 1010, a wireless LAN state determination unit 1020, and a NAN function adjustment unit 1030 are the same as the wireless LAN function control unit 200, the NAN function control unit 210, the wireless LAN state determination unit 220, and the NAN function adjustment unit 230 of FIG. 2 described in the first embodiment and a description thereof will be omitted. A position information acquisition unit 1021 acquires the position information of the STA 100. For example, the position information acquisition unit 1021 acquires the position information of the STA 100 as the self apparatus using GPS (Global Positioning System).

Figure 11:
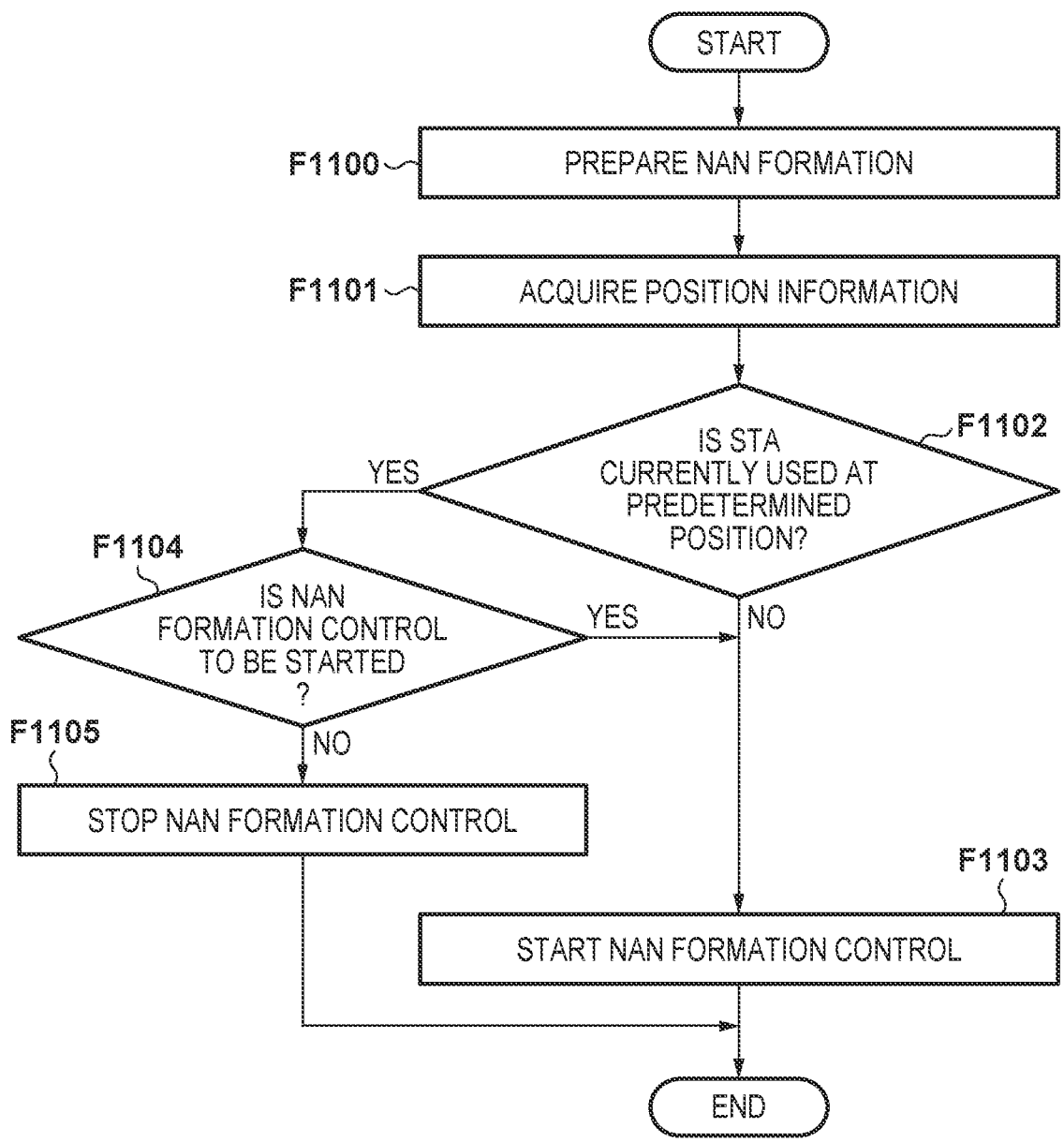
FIG. 11 is a flowchart illustrating the processing of the STA 100 according to the seventh embodiment.

FIG. 11 is a flowchart illustrating processing performed when the control unit of the STA 100 executes a program stored in a storage unit according to this embodiment. In this embodiment, the processing shown in FIG. 11 is executed when, for example, the STA 100 performs a neighbor awareness operation to make desired communication while power is supplied to the STA 100, the wireless LAN function control unit 1000 is in the enable state, and the STA 100 can operate as an STA. The processing is started by a user operation on an input unit 304, an instruction of an application, or the like.

After the start of the processing, in step F1100, the NAN function adjustment unit 1030 detects the start of control by the NAN function control unit 1010. In step F1100, the STA 100 is in a NAN formation preparation stage, and the control by the NAN function control unit 1010 may not have been started yet or may have been partially started. In step F1101, the position information acquisition unit 1021 acquires the position information of the STA 100. In step F1102, the wireless LAN state determination unit 1020 determines based on the position information acquired in step F1101 whether the wireless LAN device is currently used at a predetermined position. For example, the wireless LAN state determination unit 1020 determines whether the STA 100 is currently used at a predetermined position registered in advance by the user, for example, at home. If it is determined that the STA 100 is not currently used at the predetermined position (NO in step F1102), the process advances to step F1103; otherwise (YES in step F1102), the process advances to step F1104.

In step F1103, the NAN function adjustment unit 1030 switches the control by the NAN function control unit 1010 to the enable state. In response to this, the NAN function control unit 1010 forms a neighbor awareness network, performs control to recognize a neighboring wireless LAN device, and terminates this processing. On the other hand, in step F1104, the STA 100 determines, with the user via an output unit 305, whether to perform control to recognize a neighboring wireless LAN device. If the STA 100 accepts input of processing from the user via the input unit 304, and the user determines to perform control to form a neighbor awareness network (YES in step F1104), the process advances to step F1103; otherwise (NO in step F1104), the process advances to step F1105. In step F1105, the NAN function adjustment unit 1030 switches the control by the NAN function control unit 1010 to the disable state. In response to this, the NAN function control unit 1010 terminates this processing without performing control to recognize a neighboring wireless LAN device.

As described above, according to the above embodiment, a wireless LAN device which attempts to form a neighbor awareness network determines the wireless communication state of itself, and switches based on the determination result whether to advance or stop the control to form the neighbor awareness network. This allows the wireless LAN device to efficiently use the neighbor awareness network without unnecessarily increasing the power consumption or calculation processing.

The embodiments for carrying out the present invention have been described above. These embodiments are merely examples to implement the present invention, and the present invention is not limited to them.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-185514, filed Sep. 18, 2015 which is hereby incorporated by reference herein in its entirety.

What is claimed is:

1. A communication apparatus comprising:
at least one processor; and
at least one memory storing code to be executed by the at least one processor, wherein the at least one processor executes the code to:
  detect a start instruction for communicating in compliance with a Neighbor Awareness Networking (NAN) standard;
  determine whether the communication apparatus currently performs communication using a frequency channel other than a predetermined frequency channel used in the NAN, in a case where the start instruction is detected;
  start to form the NAN in response to a user operation for starting the communication compliant with the NAN standard, in a case where a result of the determining indicates that the communication apparatus currently performs communication using the frequency channel other than the predetermined frequency channel used in the NAN, and start to form the NAN without the user operation, in a case where a result of the determining does not indicate that the communication apparatus currently performs communication using the frequency channel other than the predetermined frequency channel used in the NAN;
  determine whether the communication apparatus is currently connected to an access point already registered in the communication apparatus; and
  display a screen for a user to confirm whether or not to start the communication compliant with the NAN standard in a case where the result of the determining indicates that the communication apparatus currently performs communication using the frequency channel other than the predetermined frequency channel used in the NAN, wherein the at least one processor executes the code to start the communication compliant with the NAN standard according to the user operation performed after the screen is displayed.

2. The communication apparatus according to claim 1, wherein the at least one processor further executes the code to determine whether the communication apparatus is currently connected to an access point.

3. The communication apparatus according to claim 1, wherein the communication apparatus is connected to a wireless LAN that complies with IEEE802.11 standard.

4. The communication apparatus according to claim 1, wherein the communication compliant with the NAN standard includes processing of detecting a discovery beacon.

5. The communication apparatus according to claim 1, wherein the at least one processor further executes the code to:
  determine whether the communication apparatus is currently connected to an infrastructure network of a wireless LAN, in a case where the start instruction is detected, and
  start a communication compliant with the NAN standard in response to a user operation for starting the communication compliant with the NAN standard, in a case where it is determined that the communication apparatus is currently connected to the infrastructure network.

6. A control method for a communication apparatus comprising:
  detecting a start instruction for communicating in compliance with a Neighbor Awareness Networking (NAN) standard;
  determining whether the communication apparatus currently performs communication using a frequency channel other than a predetermined frequency channel used in the NAN, in a case where the start instruction is detected;
  starting to form the NAN in response to a user operation for starting the communication compliant with the NAN standard, in a case where it is determined that the communication apparatus currently performs communication using the frequency channel other than the predetermined frequency channel used in the NAN, and start to form the NAN without the user operation, in a case where it is not determined that the communication apparatus currently performs communication using the frequency channel other than the predetermined frequency channel used in the NAN;
  determine whether the communication apparatus is currently connected to an access point already registered in the communication apparatus; and
  displaying a screen for a user to confirm whether or not to start the communication compliant with the NAN standard in a case where the result of the determining indicates that the communication apparatus currently performs communication using the frequency channel other than the predetermined frequency channel used in the NAN, wherein starting the communication compliant with the NAN standard according to the user operation performed after the screen is displayed.

7. A non-transitory computer-readable storage medium storing a computer program which causes a computer to execute a control method for a communication apparatus, the method comprising:

detecting a start instruction for communicating in compliance with a Neighbor Awareness Networking (NAN) standard;

determining whether the communication apparatus currently performs communication using a frequency channel other than a predetermined frequency channel used in the NAN, in a case where the start instruction is detected;

starting to form the NAN in response to a user operation for starting the communication compliant with the NAN standard, in a case where it is determined that the communication apparatus currently performs communication using the frequency channel other than the predetermined frequency channel used in the NAN, and start to form the NAN without the user operation, in a case where it is not determined that the communication apparatus currently performs communication using the frequency channel other than the predetermined frequency channel used in the NAN;

determine whether the communication apparatus is currently connected to an access point already registered in the communication apparatus; and displaying a screen for a user to confirm whether or not to start the communication compliant with the NAN standard in a case where the result of the determining indicates that the communication apparatus currently performs communication using the frequency channel other than the predetermined frequency channel used in the NAN, wherein starting the communication compliant with the NAN standard according to the user operation performed after the screen is displayed.

* * * * *